(12) United States Patent
Hogesta

(10) Patent No.: US 7,316,302 B2
(45) Date of Patent: Jan. 8, 2008

(54) MOTORCYCLE DISK-BRAKE LOCK

(76) Inventor: Efraeyim Hogesta, Ha'Hadas 705, Moshav Burgata 42860 (IL)

( * ) Notice: Subject to any disclaimer, the term of this patent is extended or adjusted under 35 U.S.C. 154(b) by 80 days.

(21) Appl. No.: 11/262,815

(22) Filed: Nov. 1, 2005

(65) Prior Publication Data

US 2006/0112739 A1    Jun. 1, 2006

Related U.S. Application Data

(63) Continuation-in-part of application No. 10/498,574, filed as application No. PCT/IL02/00986 on Dec. 5, 2002, now abandoned.

(60) Provisional application No. 60/339,464, filed on Dec. 14, 2001.

(51) Int. Cl.
*F16D 69/00* (2006.01)

(52) U.S. Cl. ............... 188/265; 188/18 A; 188/31; 70/233

(58) Field of Classification Search ............ 188/17, 188/18 R, 18 A, 28, 31, 265, 69; 70/33, 70/34, 233, 226
See application file for complete search history.

(56) References Cited

U.S. PATENT DOCUMENTS

| | | | |
|---|---|---|---|
| 4,346,619 A * | 8/1982 | Fehling .................... 74/551.1 |
| 4,436,232 A | 3/1984 | Zane et al. |
| 5,109,686 A | 5/1992 | Toussant |
| 5,127,562 A | 7/1992 | Zane et al. |
| 5,265,451 A | 11/1993 | Phifer |
| 5,492,206 A | 2/1996 | Shieh |
| 5,662,255 A | 9/1997 | Lu |
| 5,823,025 A * | 10/1998 | Phifer .................... 70/226 |
| 6,131,427 A | 10/2000 | Webber et al. |
| 6,178,787 B1 * | 1/2001 | Titterton ................. 70/33 |
| 6,230,530 B1 | 5/2001 | Voigt et al. |
| 6,553,793 B1 * | 4/2003 | Chen ..................... 70/33 |
| 6,663,129 B1 | 12/2003 | Smith |
| 2003/0188938 A1 * | 10/2003 | Li ....................... 188/265 |
| 2007/0022791 A1 * | 2/2007 | Torrado et al. ........... 70/33 |

FOREIGN PATENT DOCUMENTS

| | | |
|---|---|---|
| DE | 20002685 | 6/2000 |
| EP | 0716007 | 6/1996 |
| NL | 9300794 | 12/1994 |

OTHER PUBLICATIONS

Luma catalog for XMART motorcycle lock No date found.*

* cited by examiner

*Primary Examiner*—Devon Kramer
(74) *Attorney, Agent, or Firm*—The Nath Law Group; Jerald L. Meyer; Matthew J. Moffa

(57) ABSTRACT

A motorcycle disk-brake lock which makes it highly unlikely or prevents normal operation of the motorcycle while the lock is engaged with a disk-brake of the motorcycle and to thereby provide a clear alert to an operator thereof, and which can be conveniently stored and transported when not in use as a disk-brake lock.

23 Claims, 9 Drawing Sheets

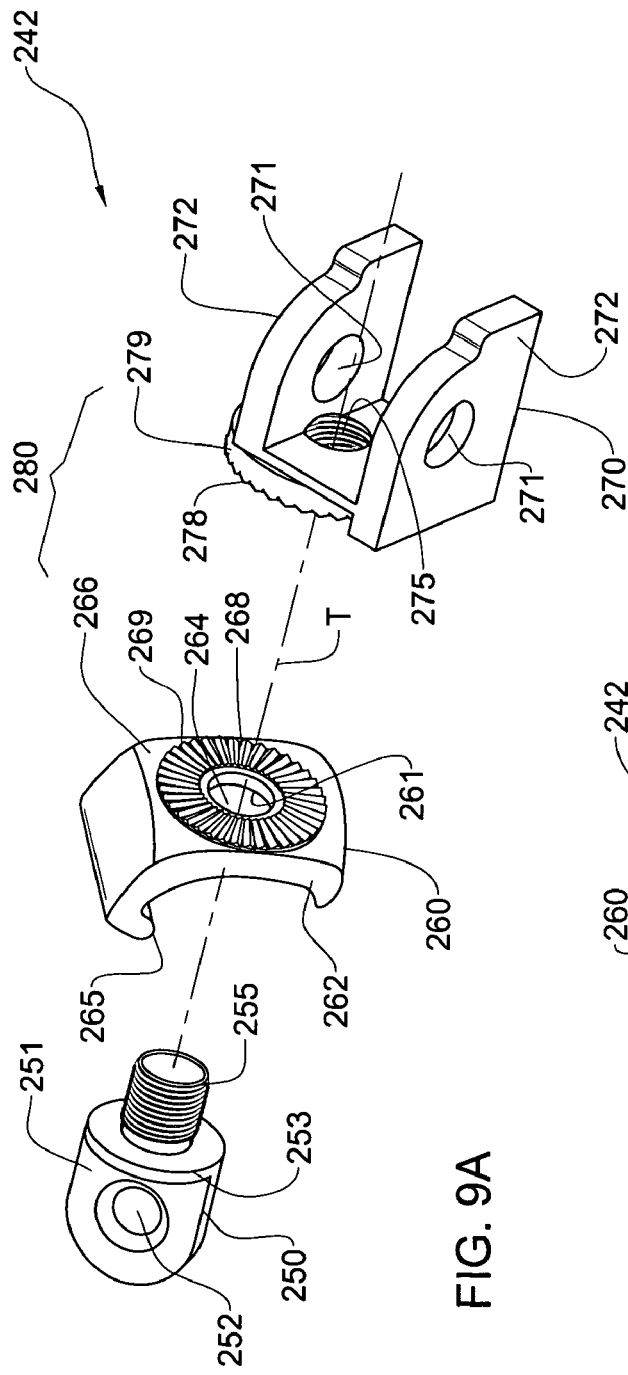
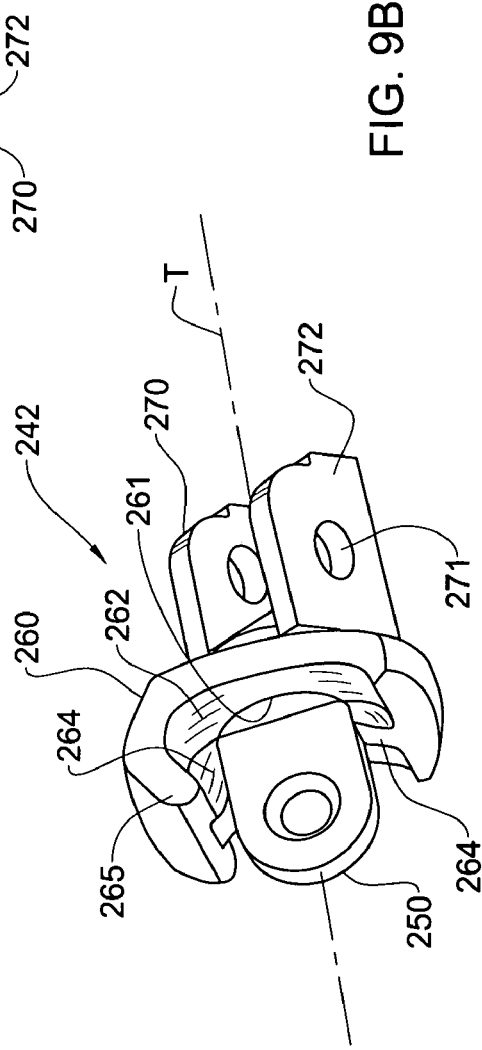
FIG. 9A
FIG. 9B

MOTORCYCLE DISK-BRAKE LOCK

This is a Continuation-In-Part of U.S. application Ser. No. 10/498,574, filed Jun. 14, 2004, now abandoned which is a national phase application of International PCT Application No. PCT/IL02/00986 filed Dec. 5, 2002 and claims benefit from U.S. Provisional Application 60/339,464 filed Dec. 14, 2001, the contents of which are hereby incorporated by reference in their entirety.

FIELD OF THE INVENTION

The present invention relates to a motorcycle disk-brake lock, and more particularly to a disk-brake lock which provides a clear indication to a user thereof that the lock is engaged with the disk-brake, to thereby prevent an offhand attempt to drive the motorcycle while the lock is engaged with the disk-brake.

BACKGROUND OF THE INVENTION

Various anti-theft devices for motorcycles have been suggested along the years. The simplest security device is a large chain, which can be looped through one of the wheels and/or a portion of the frame (interchangeably referred to also as chassis), and often also secured around a suitable stationary object such as a tree or lamp post. The chain must be sufficiently long, making it cumbersome to store and carry.

Other anti-theft arrangements for motorcycles are alarm systems with or without immobilizing systems, GPS assisted tracking systems, etc.

Alternatively, a disk-brake lock may be used. This is a lock, such as that described in U.S. Pat. No. 5,265,451 to Phifer and U.S. Pat. No. 5,492,206 to Shieh, which is secured through one of the holes formed in the disk portion of a disk-brake, preventing rotation of the motorcycle wheel. This is a highly effective anti-theft device, but has two main disadvantages:

A. It is possible for the motorcyclist to attempt traveling on a motorcycle a very short distance with the lock in place. This may occur when the owner of the motorcycle forgets that the lock is engaged, or during an attempted of theft by a potential thief or even an un-aware authorized user. In such situations, the operator starts the motorcycle, shifts into first gear and starts to roll. The wheel will be able to rotate until the disk-brake lock comes into contact with the brake caliper or some other part of the motorcycle, upon which the wheel will abruptly stop rotating.

This would likely cause the motorcycle to fall over, possibly over the rider, or cause the driver to be thrown from the motorcycle and injured and likely cause damage to various parts of the motorcycle, e.g. damage the disk-brake, necessitating extremely expensive repair work. Some statistics suggest that perhaps about 10% of motorcycle accidents may be due to attempting to drive a motorcycle with the disc brakes still engaged.

Devices intended to warn an operator that a locking device is attached to the motorcycle are known, including U.S. Pat. No. 6,230,530 to Voigt et al. However, in moments of stress or when hurrying, the operator may not notice the warning device or even a warning signal. An ideal lock reminder device would therefore preclude operation of the motorcycle while the lock is engaged. A device aimed at fulfilling this purpose is described by Titterton in U.S. Pat. No. 6,178,787. However, this does not solve the second problem associated with disk-brake locks, as described below.

B. Disk-brake locks are very heavy and bulky and are therefore difficult to transport when the motorcycle is in use, and therefore a suitable storage location is required for this particular style of locks. A disk-brake lock is commonly stored in a pouch or storage bin attached to the chassis of the motorcycle, in the helmet compartment, or similar storage devices, which are extremely inconvenient, or are carried by the operator.

As described in U.S. Pat. No. 4,436,232 to Zane et al., a lock holder has been devised for fastening to the frame of a motorcycle for carrying a motorcycle lock. This comprises a mounting unit for fixing to the frame of a motorcycle and a carrier unit at one side of the mounting unit for carrying a motor lock. However, the lock holder may be heavily vibrated when the motorcycle runs over an uneven road, causing the lock to fall out of the holder. Further lock holders include that described by Lu in U.S. Pat. No. 5,662,255.

U.S. Pat. No. 6,131,427 to Webber et al. describes an elongated footpeg which serves also as a lock holder for a motorcycle but not as the lock itself, and the disk lock may be carried by an elongated foot-peg/lock holder. However, this elongated holder is deliberately intended to function for dual purpose, namely as a carrier of the lock and as a foot rest peg for the motorcycle, even in the absence of the lock. The holder is not intended for and is not capable of preventing operation of the motorcycle when the lock is detached from the holder. The holder acts as a foot peg even when the lock is detached therefrom, and is not designed to, nor does it provide a significant reminder for the operator to remove the disk-brake lock from the disk brake.

Therefore, it is an object of the present invention to provide a motorcycle disk-brake lock which makes it highly unlikely or prevents normal operation of the motorcycle while the lock is engaged to the disk-brake and to thereby provide a clear alert to an operator thereof, and which can be conveniently stored and transported when not in use as a disk-brake lock. Even more so, an attempt to break the lock may result in irreversible damage thereto such that it may no longer serve functionally, thus prevent operating the motorcycle.

SUMMARY OF THE INVENTION

Accordingly, it is an object of the present invention to overcome the disadvantages of the prior art and provide a disk-brake lock which when in use as a lock prevents a motorcycle from being operated in the normal manner, and when not in use as a lock may be easily and conveniently carried on the motorcycle.

The present invention, according to its broad aspect, is directed to a disk-brake lock for a motorcycle, which lock is a functional component of the motorcycle, such that it is unlikely to start and roll the motorcycle before disengaging the lock from the disk-brake and reengaging it at another location of the motorcycle for performing its function essential for starting or driving the motorcycle.

Thus, a lock for a motorcycle is provided, said lock is detachably connectable to a mounting unit of the motorcycle said lock is suitable for locking engagement to a disk-brake of the motorcycle, wherein said lock is further configured as a functional component of the motorcycle as required for at least one of starting and driving the motorcycle when connected to said mounting unit, such that whenever said functional component is detached from the mounting unit the absence of the functional component from the mounting unit provides a prompt to alert the user, at least when attempting to start or drive the motorcycle, that the functional component may still be lockingly engaged to the disk-brake, in which case starting or driving of the motorcycle becomes at least highly unlikely.

The invention is also directed to a locking system for a motorcycle comprising a lock detachably connected to a mounting unit that is in use fixed to the motorcycle, said lock being suitable for locking engagement to a disk-brake of the motorcycle, wherein said lock is further configured as a functional component of the motorcycle as required for at least one of starting and driving the motorcycle when connected to said mounting unit, such that whenever said functional component is detached from the mounting unit, the mounting unit in the absence of the functional component provides a prompt to alert the user, at least when attempting to start or drive the motorcycle, that the functional component is not connected to the mounting unit. The functional component may comprise, for example, any one of a footpeg, a hand-grip or a gear-shift paddle of the motorcycle.

The present invention is also directed to a mounting unit being fixedly attachable to a frame of the motorcycle, wherein said unit comprises a connecting portion for detachable connection with a functional component of the motorcycle wherein whenever said functional component is detached from the mounting unit starting or driving of the motorcycle becomes highly unlikely or not possible at all, and wherein said mounting unit enables an angular orientation between said component and said mounting unit to be varied.

The present invention is also directed to a motorcycle with at least one lock detachably connectable to a mounting unit of the motorcycle, said lock is suitable for locking engagement to a disk-brake of the motorcycle, wherein said lock is further configured as a functional component of the motorcycle as required for at least one of starting and driving the motorcycle when connected to said mounting unit, such that whenever said functional component is detached from the mounting unit the absence of the functional component from the mounting unit provides a prompt to alert the user, at least when attempting to start or drive the motorcycle, that the functional component may still be lockingly engaged to the disk-brake, in which case starting or driving of the motorcycle becomes at least highly unlikely.

The term functional component as used herein the specification and claims denotes any component of the motorcycle generally required for at least one of starting or driving it, such as, for example a footrest peg, a foot-brake paddle, a gear shift peg, a hand-grip, a hand-gas grip, etc. Preferably, said functional component is an essential component, i.e. starting or riding the motorcycle is at least highly unlikely, for example due to the great difficulty in so doing, and in some cases it may be not possible at all to start/drive the motorcycle. Typically, a functional component functions and resembles in appearance a conventional corresponding component. The absence of such a functional component in its proper place when attempting to start or drive a motorcycle would generally prompt an alert in the driver that the functional component is not mounted in place. For example, a missing footrest peg, hand grip, and so on would be immediately apparent to the user at least when trying to start or drive the motorcycle. According to the present invention, since the (at least authorized) user of the motorcycle is aware of the dual function of the functional component, the alert prompts the user to associate the absence of the functional component with its dual use as a disk brake lock, and further reminds the driver to remove the lock from the brakes, and to return the functional component to its mounting.

In accordance with an embodiment of the present invention, there is provided a disk-brake lock for a motorcycle comprising a U-like shaped lock member defining a gap sized to receive a wheel disk-brake, a locking unit for removably attaching the lock member to a mounting unit at a functional location of the motorcycle and for locking engagement with the disk-brake. The arrangement is such that the locking unit of said lock member is attachable to said mounting unit for use as a functional component of the motorcycle and, when removed from said mounting unit, may be used as a wheel disk-brake lock.

It is thus possible to provide a motorcycle wherein more than one locking mechanism is provided, e.g. a first element useful as a U-like shaped lock for lockingly embracing the disk-brake (for example the disk-brake of the front wheel), and a second element useful as a locking pin (king-pin type lock) useful for locking engagement with the rear wheel of the motorcycle.

According to a different embodiment, the disk-brake lock is a pin-type lock (at times referred to as a king-pin lock) fitted for locking engagement into a hole of the disk-brake, and attachable to a mounting unit of the motorcycle in the same manner. A lock of this type may be easily fitted on either a front or a rear disk-brake of a motorcycle.

According to one embodiment of the invention, the lock member is functional as a footpeg (also referred to as a footrest) or paddle and according to another embodiment the lock member is functional as a hand grip.

According to still an embodiment of the present invention, the locking unit comprises an integral alarm system which generates an audible alarm signal upon displacement, while engaged with the disk-brake. By a further modification, the locking unit functions as an electronic immobilizer cooperating in conjunction with the mounting unit, such that the motorcycle can not be started without said locking unit. According to one particular application, an alarm/alert system is activated upon an attempt to start the motorcycle when the locking unit is disengaged from the mounting unit.

An advantage of the present invention is that the operator is instantly and automatically reminded that the lock is still engaged when attempting to operate the motorcycle.

A further advantage of the present invention is that a solution is provided for transport and placing of the lock when not in use as a lock.

According to another aspect of the invention, there is provided a motorcycle fitted with a functional component detachably connectable to a mounting unit of the motorcycle for cooperation therewith at an operative position of the motorcycle, and fitted for locking engagement to a disk-brake of the motorcycle to serve as a disk-brake lock; such that it is unlikely to start and roll the motorcycle before disengaging the lock from the disk-brake and re-engaging it to the mounting unit of the motorcycle for performing its function. Additional features and advantages of the invention will become apparent from the following drawings and description.

Thus, according to the invention a method is provided for substantially reducing the risk of a motorcycle being at least one of started or driven by a user when a brake lock is still engaged on a disk brake of the motorcycle. The method comprises:

(a) providing such a brake lock in a suitable form configured to further function as a functional component of the motorcycle as required for at least one of starting and driving the motorcycle when connected to a mounting unit of the motorcycle;

(b) engaging the brake lock of step (a) to the disk brake when it is desired to lock the motorcycle;

(c) disengaging the brake lock from the disk brake when it is desired to unlock the motorcycle;

wherein the absence of the functional component from the mounting unit following step (b) may compel the user, at least when attempting to start or drive the motorcycle, to check that the functional component may still be lockingly engaged to the disk-brake, and further prompt the user to execute step (c) before attempting to start or drive the motorcycle.

BRIEF DESCRIPTION OF THE DRAWINGS

For a better understanding of the invention and to see how it may be carried out in practice, some embodiments will now be described, by way of non-limiting examples only, with reference to the accompanying drawings, in which:

FIG. 9A is an isometric exploded view of a universal mounting unit for a lock according to an embodiment of the invention; and FIG. 9B is an isometric unexploded view of the universal mounting unit of FIG. 9A.

DETAILED DESCRIPTION OF THE INVENTION

Figure 1:
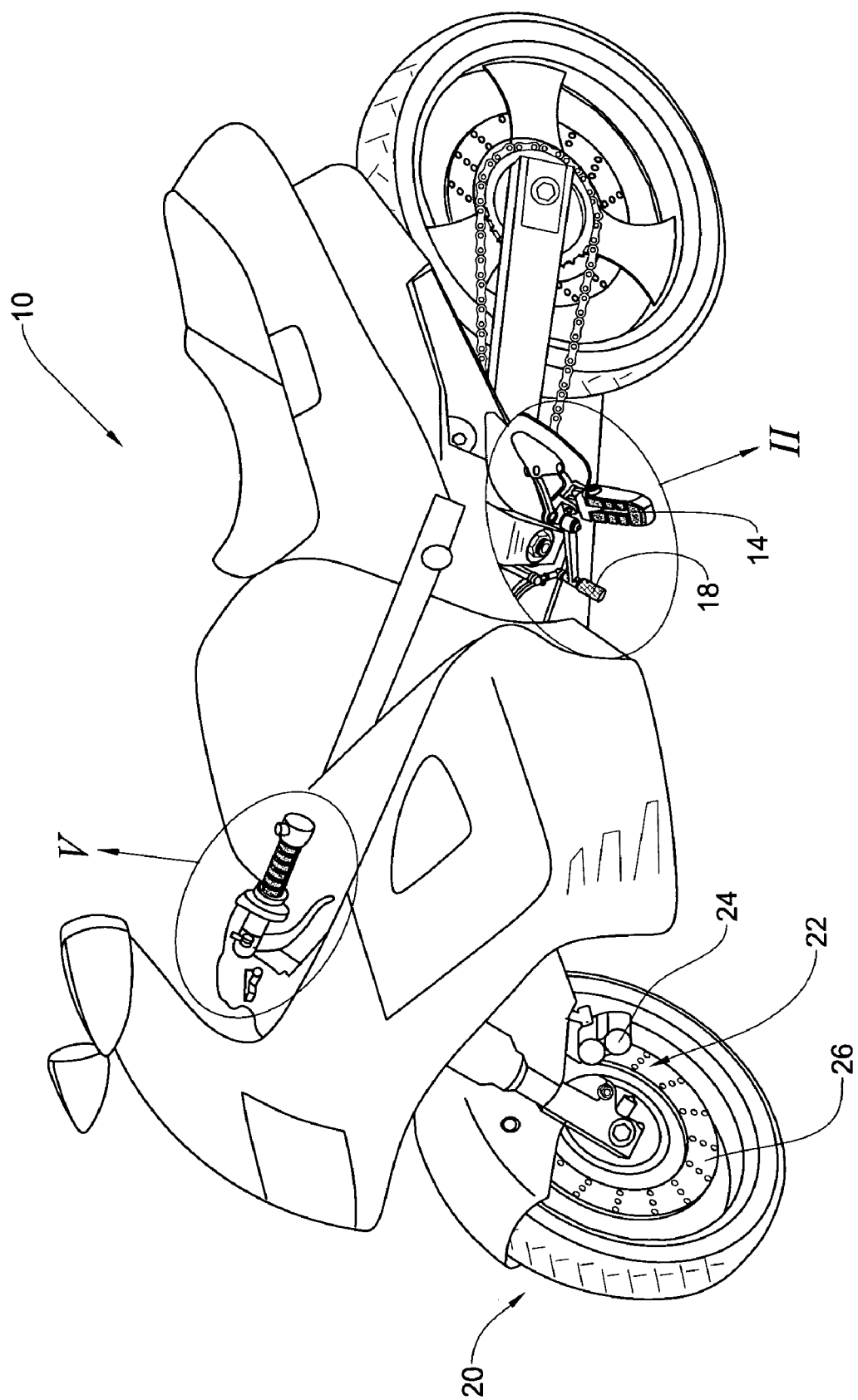
FIG. 1 is a top left isometric view of a motorcycle fitted with a disk-brake lock according to the present invention.

Attention is first directed to FIG. 1 showing a motorcycle generally designated 10 and fitted with a footpeg 14 (also known as afoot rest) on which a motorcycle rider rests his left foot during the operation of the motorcycle and a gear shift paddle 18, operable by the users left foot. Another footpeg is provided at the right side of the motorcycle, serving to rest/support the right foot which typically operates the rear brake pedal (not seen in FIG. 1). The footpeg 14 is a simple device, extending essentially horizontally perpendicular to the body of the motorcycle, which in some instances may be collapsible.

The front wheel assembly 20 of the motorcycle 10 is fitted with a disk-brake assembly 22 comprising a hydraulic caliper system 24 and a braking disk (disk-brake) 26, wherein braking occurs upon squeezing a hand-brake lever (not seen) whilst gripping a hand-grip (also not seen in FIG. 1), resulting in clamping of the calipers about the braking disk 26, as known per se.

As can better be seen in the enlargement FIGS. 2 to 7, each of the footpeg 14, the paddle portion of gear shift paddle 18 and both hand-grips, comprises a metal core (not clearly seen in some of the Figs.) provided with an outer layer of rubber or similar non-slip material to prevent the operator's foot or hand, respectively, from slipping off the peg or paddle or improving the hand grip, as may be the case. In some cases, a footpeg is provided at a bottom outer end with a ground 'sensor' or ground sensing probe, (not shown) which may be in the form of a downwardly projecting pin useful for indicating to the rider the extent of inclination of the motorcycle, when riding in a curb.

With further reference being made now to FIGS. 2 and 3A to 3C, there is illustrated a first embodiment of a disk-brake lock according to the invention, where the lock is configured as a footpeg 14, which is removably attached to the motorcycle via a mounting unit 42 (best seen in FIG. 3B) and fastened thereto by pin-lock mechanism 46. A through-hole 50 (seen in FIG. 4) is formed in footpeg 14, such that it may be attached to mounting unit 42 by insertion of the pin-lock mechanism 46 there through. Mounting unit 42 is itself fixedly attached to the motorcycle by a bolt or other standard connecting device or being welded thereto. Pin-lock mechanism 46 is locked and unlocked by appropriate rotation of a key 48 (FIG. 3A) in order for footpeg 14 to be attached to or removed from mounting unit 42. The overall appearance of the footpeg 14 is the same as a conventional footpeg and its functionality is not affected by its use also as a lock. Preferably, some covering is provided (not shown) for covering the key-hole of the pin-lock mechanism to thereby protect the locking mechanism from ingress of dirt, mud, water, etc.

It is appreciated that according to an embodiment of the invention, the mounting unit 42 may be attached to the motorcycle also in retrofit, i.e. after the motorcycle has left the factory.

Figure 4:
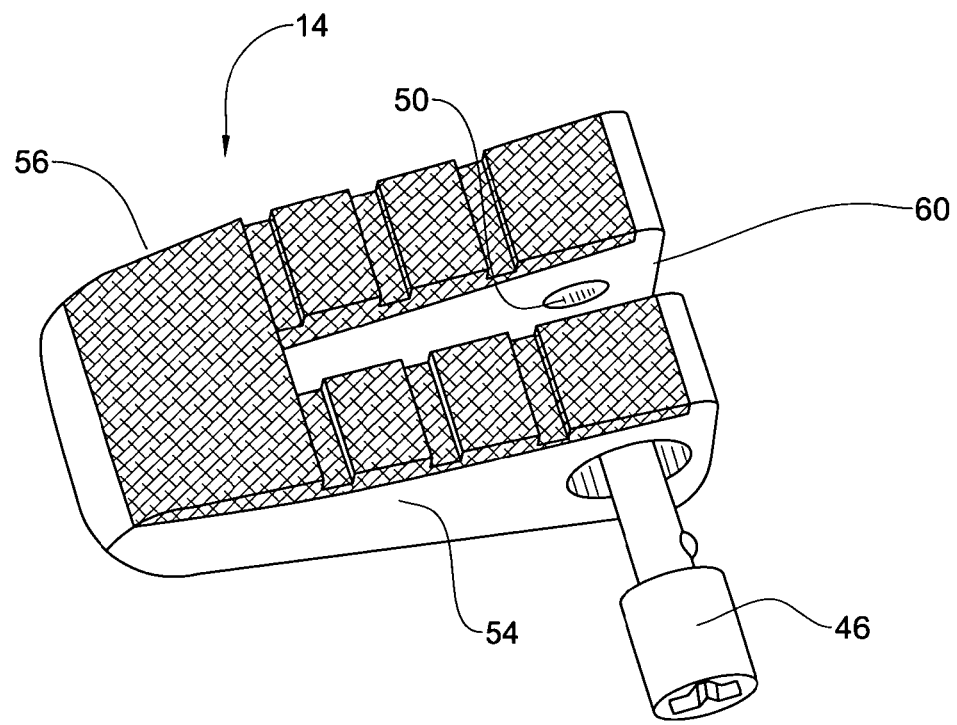
FIG. 4 is an isometric view of the dual-function disk-brake lock/footpeg of FIG. 3 isolated from the motorcycle.

As can be seen in the Figures, and best in FIG. 4, the dual-function disk-brake lock/footpeg 14 comprises a substantially 'U'-like shaped metal body 54 having a rubber anti-slip layer 56 along its upper surface and outer edge. The region between the two parallel sides of the 'U' forms a disk receiving slot 60.

Figure 2:
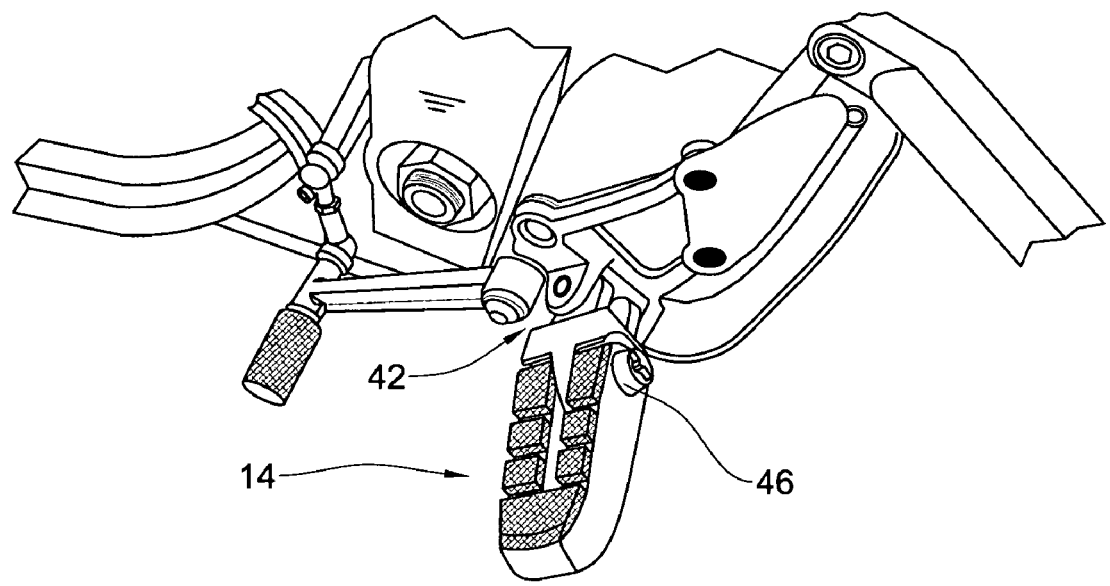
FIG. 2 is an enlargement of the portion marked II in FIG. 1, illustrating the footpeg and gear-shift paddle zone.
Figure 3A:
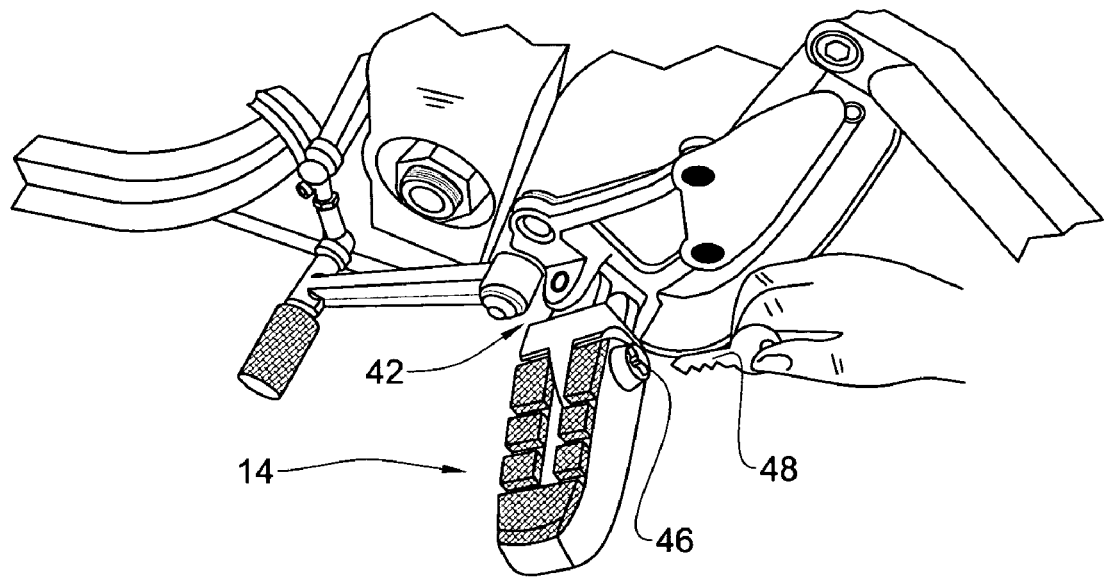
FIG. 3A shows the use of a key to remove a multi-purpose disk-brake lock/footpeg from a connector unit on which it is mounted in the footpeg configuration, according to a first embodiment thereof.
Figure 3B:
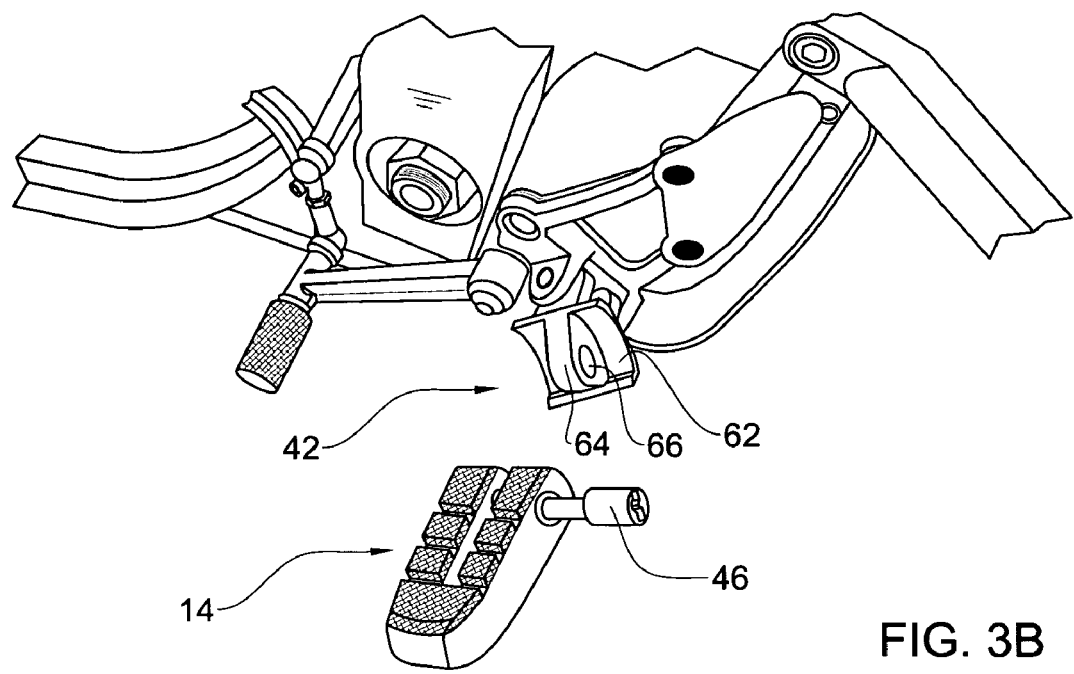
FIG. 3B shows the footpeg mounting adapter upon removal of the disk-brake lock/footpeg.

In FIG. 2 the disk-brake lock/footpeg 14 is seen in its footpeg configuration functional to support the left foot of the motorcycle rider. In FIG. 3A the pin-lock mechanism 46 is unlocked to enable detachment of the footpeg 14 from the mounting unit 42, as seen in FIG. 3B. This position in itself makes it rather uncomfortable or impossible to ride the motorcycle as the rider will encounter difficulties in shifting gears by means of gear-shift paddle 18.

FIG. 3B shows mounting unit 42 upon removal of disk-brake lock/footpeg 14. Mounting unit 42 comprises a body section 62 fitted with a projecting member 64, formed with a central through-hole 66 for insertion of a locking pin of the pin-lock mechanism 46. At the assembled position of the footpeg 14 over the mounting unit 42, the foot peg is steady and provides firm support. However, according to some embodiments, the footpeg may be foldable about the mounting unit.

Figure 3C:
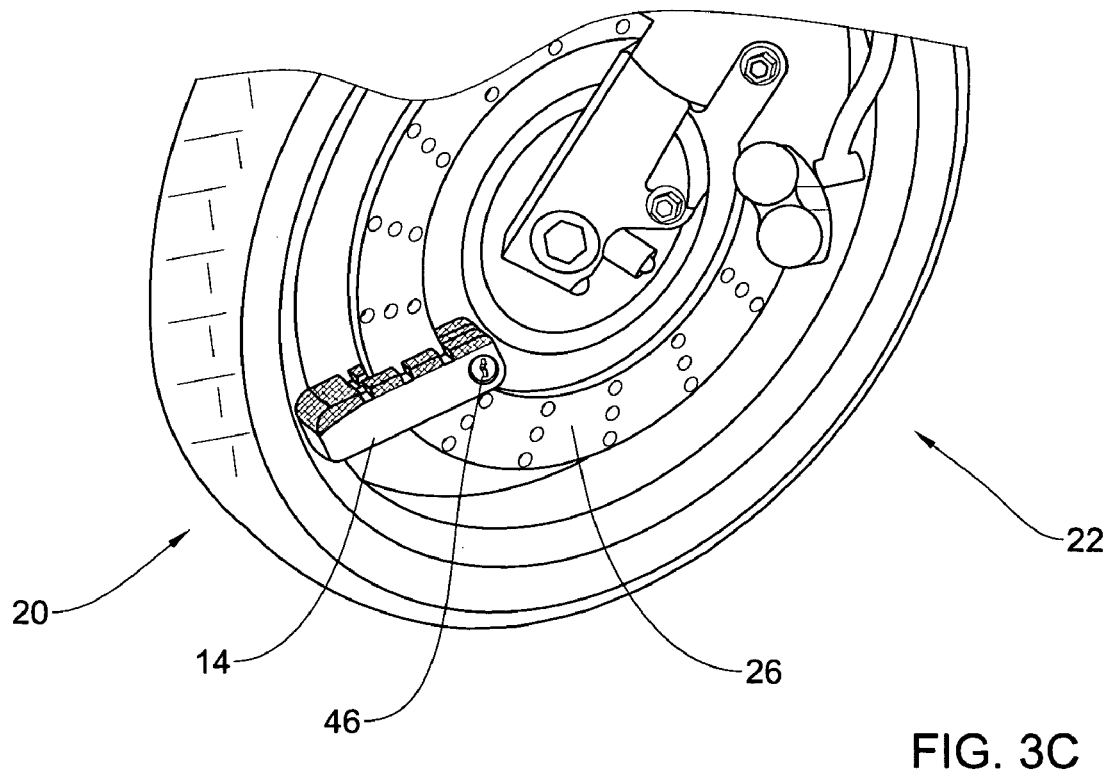
FIG. 3C shows a portion of a disk-brake with the disk-brake lock/footpeg in use as a motorcycle disk-brake lock.

Referring now to FIG. 3C, the disk-brake lock/footpeg 14 is shown in use as a disk bake lock. The disk-brake lock/footpeg 14 is mounted on the motorcycle disk-brake 26 such that the disk receiving slot 60 (best seen in FIG. 4) embraces the disk-brake, and then the footpeg/disk-brake lock 14 is locked in place by means of the pin-lock mechanism 46. The motorcycle disk-brake lock/footpeg of the present invention provides a disk-brake lock for use as an anti-theft device, such that the motorcycle cannot be operated with the disk-brake lock engaged, whereby the wheel of the motorcycle is unable to complete a full revolution.

Thus, if the driver attempts to start or drive the motorcycle when the foot peg 14 is not connected to the mounting unit 42, the absence of the expected rest for the driver's foot prompts an alert in the driver that something is not as it should be, since the driver automatically and subconsciously expects that his/her foot will rest against the foot peg, and the lack of a support for the foot should alert the driver. Accordingly, and in the normal turn of events, the driver will pay attention to this alert, and should normally associate the absence of foot support with the fact that the foot peg is still being used as a lock, and will check this. If in fact this is so, the driver will remove the lock from the disk-brake and reconnect it to the mounting unit 42. If for any reason the lock is not engaged with the disk-brake (for example, it was removed previously, but the driver was distracted and forgot to reconnect it to the mounting unit 42), the driver knows that it is nevertheless safe to drive the motorcycle, but will first reconnect the foot peg 14 to the mounting unit 42. Thus, the absence of the foot peg 14 in the scenario illustrated in FIG. 3B alerts the driver of the possibility of the scenario illustrated in FIG. 3C still being current, and rendering starting or driving the motorcycle generally unlikely, or not possible in many circumstances according to the actual nature of the functional component.

Optionally, and as illustrated in FIGS. 9A and 9B, a universal mounting unit 242 may be provided that is adjustable and for example enables the foot peg 14 of the invention to be used therewith on the left or right side of the motorcycle. The mounting unit 242 according to the illustrated embodiment comprises a first bracket 250, a base 260 and a second bracket 270. The first bracket 250 is configured for enabling the foot peg 14 to be mounted thereto, and comprises a relatively stubby and flat projection 251, projecting from a disc-like central section 253, and having a through hole 252. The projection 251 is adapted for enabling the disk-receiving slot 60 to engage the same, such that the through holes 50 are aligned with hole 252, so that pin lock mechanism 46 can lock the footpeg 14 to the first bracket 250. The first bracket 250 further comprises a pin 255, which may be threaded, and which projects from the mid-section 253 in a direction opposed to the projection 251.

The base 260 comprises a footpeg facing side 262 having a recess 261 for receiving central section 253, and a through hole 264 through which the pin 255 projects when the base 260 and first bracket 250 are engaged. The base 260 further comprises a motorcycle facing side 266 opposed to the aforesaid footpeg facing side 262.

The central section 253 and/or recess 261 may optionally be configured to prevent any relative rotation therebetween, so that the first bracket 250 is always oriented in the same manner with respect to the base 260. For example, the central section 253 may have a polygonal or oval section, rather than the circular section illustrated in the figures, and the recess is complementarily shaped to receive the same in a particular orientation, or in one of a finite number of orientations, and when assembling the unit 242 one of the orientations may be chosen. Alternatively, a key may be provided.

The footpeg facing side 262 may also comprise web portions 264 which are aligned with the flat projection 251, such as to provide a wider engagement surface for the slot 60. The base 260 may further optionally comprise a jaw member 265 projecting at one end thereof and substantially orthogonal to the web portions 264. In operation, the jaw member 265 engages with a correspondingly optional complementary recess on the top part of the footpeg 14, and further assists in the engagement of the footpeg 14 with the mounting unit 242.

Optionally, the hole 252 may be provide a clearance with respect to pin lock mechanism 46, so that foot induced loads on the foot peg 14 are transmitted to the mounting unit 242 via the first bracket 250, in particular the footpeg facing side 262 including the jaw member 265.

The second bracket 270 is adapted for connecting the mounting unit 242 to the motorcycle. The second bracket 270 in the illustrated embodiment comprises a pair of parallel relatively flat projections 272 comprising aligned through holes 271. The projections 272 may be permanently fixed or rotatably mounted to a suitable bracket in the frame of the motorcycle. In the latter case, the footpeg 14 (when connected to the mounting unit 242, may be swung from a retracted position to a deployed position, wherein a foot may be rested on it in the normal manner. Alternatively, the projections 272 may be suitably spring-loaded so as to deflect the foot peg 14 away from the motorcycle frame when the motorcycle topples over, so as to prevent potentially damaging loads to be transmitted to the frame by the footpeg in such situations.

According to the invention, the second bracket 270 may be adapted for the particular motorcycle design that it is intended to fit the universal mounting unit 242 to, while the first bracket 250 and base 260 may be of standard design to fit with any type of second bracket 270. Thus, the second bracket 270 may comprise any suitable arrangement corresponding to and designed for engaging with a particular model of motorcycle.

The base 260 and/or the second bracket are configured such as to permit the two to be mounted in any one of a plurality of relative orientations. In the illustrated embodiment, each of the motorcycle facing side 266 and a base-facing side 273 of the second bracket 270 comprises complementary parts 269, 279, respectively, of a variable attitude mechanism 280. This mechanism 280 allows the orientation of the footpeg 14 (when connected to the mounting unit 242) to be adjusted to any desired orientation effectively with respect to a transverse axis or to an axis T at some angle α to the transverse axis of the motorcycle (see FIG. 3B). The transverse axis is in the side-to-side direction with respect to the motorcycle, substantially orthogonal to the vertical and longitudinal axes of the motorcycle. Each of the complementary parts 269, 279, comprises a generally annular engagement surface, comprising a plurality of alternating projecting and recessed radial contact elements 268 which mate with complementary recessed and projecting radial contact elements 278, respectively of the other one of the complementary parts 269, 279. For example, the contact elements may be in the form of radial teeth. As the contact elements 268, 278, are symmetrically and evenly distributed about the annular engagement surfaces, the motorcycle facing side 266 and the base-facing side 273 may be engaged in any one of a plurality of relative angular positions with respect to axis T, correlated to the number of said contact elements in each said engagement surface.

Alternatively, for example, the complementary parts 269, 279 could comprise one a star-shaped planar plateau or a polygonally-shaped plateau, and the other a complementarily shaped recess, providing a number of possible alternative angular dispositions. Many other alternatives are possible for the mechanism 280.

The pin 255 projects through the base 260 and engages with a threaded bore 275 comprised in the second bracket 270, locking the three elements—first bracket 250, base 260 and second bracket 270—together at a desired angle between the first bracket 250 and base 260, and the second bracket 270. Optionally, a spring washer (not shown) or the like may be included between the first bracket 250 and the base 260. Thus, the three elements are locked together tightly while maintaining alignment between the first bracket 250 and the base 260.

Alternatively, the pin 255 may project through and beyond the aligned aperture 275 (which is then not required to be threaded), and a suitable nut or the like (not shown) is screwed to the pin 255, locking the three elements—first bracket 250, base 260 and second bracket 270—together at a desired angle between the first bracket 250 and base 260, and the second bracket 270.

Alternatively, for example, the second bracket 270 may comprise a locking pin extending through the base and into a suitable engaging bore in the first bracket 250.

Alternatively, any other suitable locking mechanism may be used for permanently or reversibly locking together the first bracket, base and second bracket.

In other embodiments of the universal mounting unit, the first bracket and base may be integrally formed.

A feature of the universal mounting unit 242 according to the invention is that it enables the angle of the footpeg 14 with respect to the axis T to be set according to the drivers preference, and is thus retrofittable or usable even with regular prior art foot pegs that are not also configured as disk brake locks. Another feature of the universal mounting unit 242 according to the invention is that the same parts—mounting unit 242 and footpeg 14—may be used for the right hand and left hand sides of the motorcycle, by simply adjusting the angular dispositions of the footpeg 14 with respect to the mounting unit 242 in opposite directions for the two sides. This has certain advantages to the users, who can swap the locking system from one side to the other, and also to manufacturers, wholesalers and retailers, who only need to provide one universal version rather than a left hand and a right hand version for each model thereof.

Figure 5A:
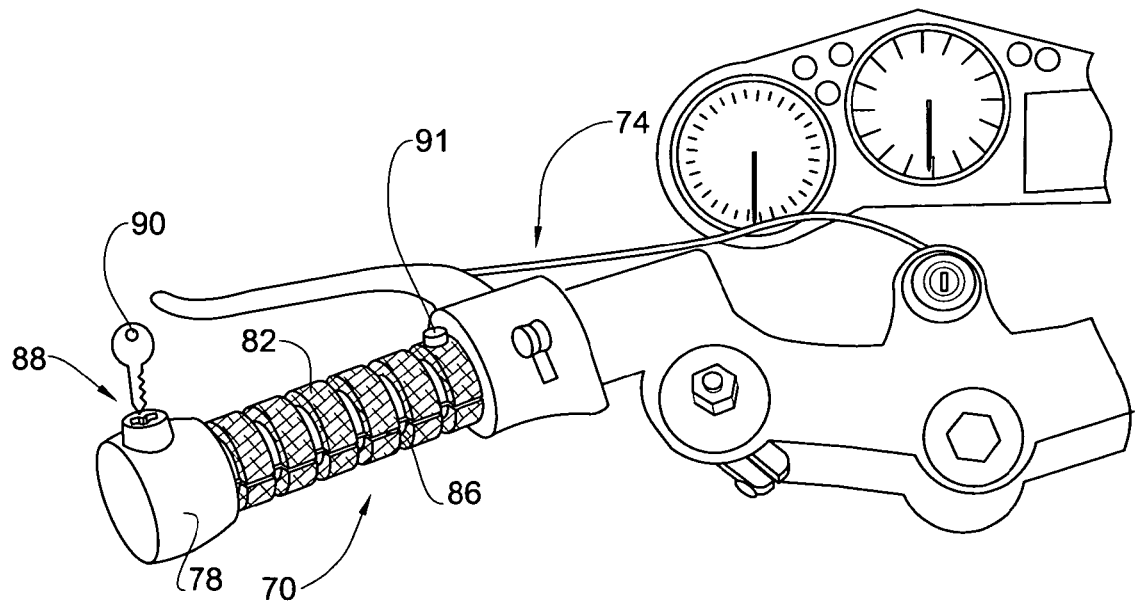
FIG. 5A is an enlargement of the portion marked V in FIG. 1, illustrating a hand-grip useful also as a disk-brake lock, according to another embodiment of the present invention.
Figure 5B:
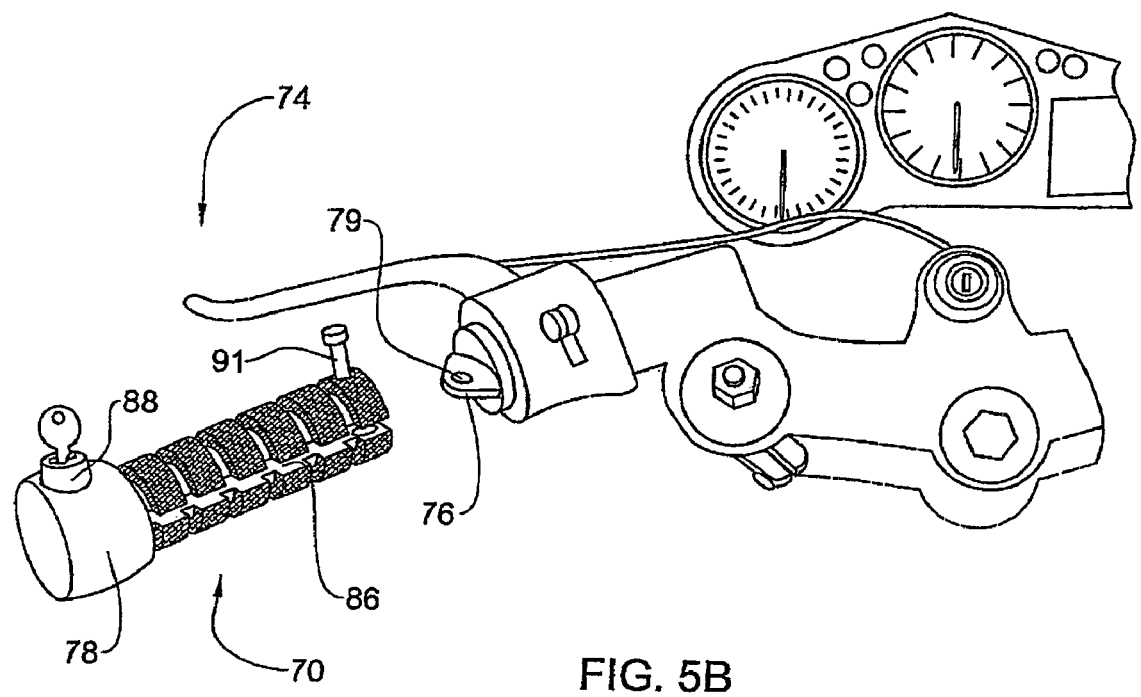
FIG. 5B is an exploded view showing the disk-brake lock/hand-grip and the hand-grip mounting adapter.
Figure 5C:
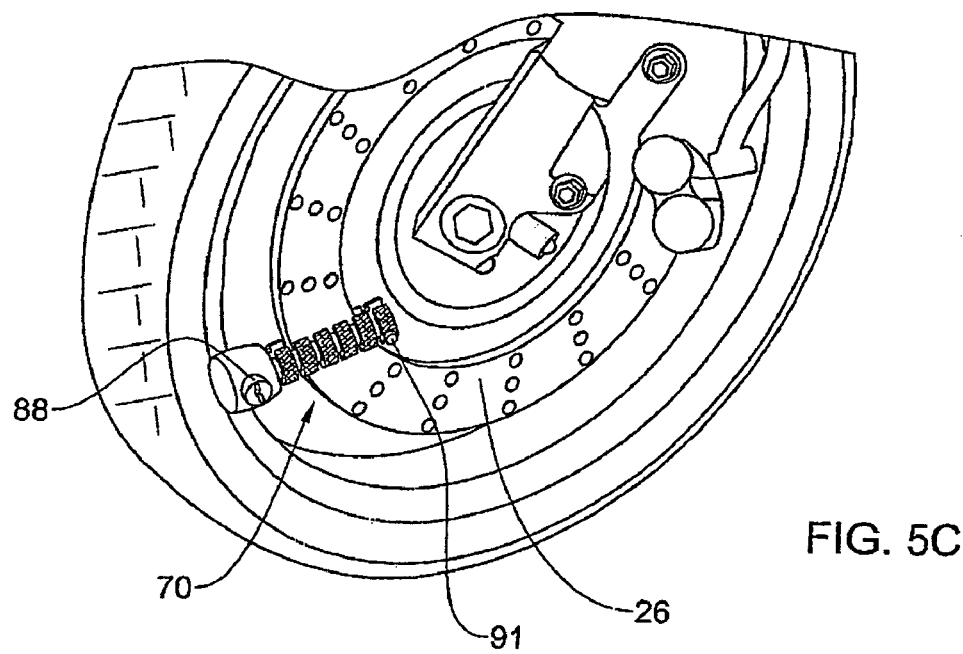
FIG. 5C shows a portion of a disk-brake fitted with the disk-brake lock/hand-grip in use as a motorcycle disk-brake lock.

Further attention is now directed to FIGS. 5A to 5C illustrating a further embodiment of a disk-brake lock in accordance with the present invention where a handgrip generally designated 70 (FIG. 5A) is detachably connected to the handlebar assembly 74 by means of a mounting unit 76 (FIG. 5B). The handgrip 70 is a generally round member having a solid metal core 78 and is coated with a suitable rubber 82 for effective and pleasing hand-gripping. The handgrip 70 is formed with a disk-receiving slot 86 sized to accommodate the disk-brake 26.

The handgrip 70 is detachable from the mounting unit 76 by a locking mechanism 88 which by means of a key 90 may be locked and firmly attached to the mounting unit 76 by a locking pin 91, or unlocked to remove the handgrip 70 so it can facilitate as a disk-brake lock, in FIG. 5C. When the handgrip 70 is mounted on the disk-brake 26 it is locked in position by same locking mechanism 88 and corresponding locking pin 91. An example of a locking mechanism suitable for that purpose is illustrated with reference to FIGS. 8B and 8C.

In order to prevent rotational displacement of the hand grip 70 with respect to the handlebar assembly 74, the mounting unit 76 is formed with a hole 79 engageable by the corresponding locking pin 91 of the handgrip, so as to ensure correct relative positioning and to prevent said rotational displacement there between.

According to a particular embodiment, the hand grip is an assembly wherein the span of the disk-receiving slot is variable between a constricted position when attached to the mounting unit, and an expanded position for locking engagement with a disk-brake. Accordingly, while attached to the mounting unit 76, the slot 86 is constricted where it is practically not noticeable (FIG. 5A), and when it is detached from the mounting unit 76 the slot 86 spontaneously expands (FIGS. 5B and 5C) to a size suited for accommodation of the disk-brake. This arrangement is facilitated by means of the locking mechanism 88 and a loaded spring (not shown).

The arrangement is such that when the handgrip 70 is in use as a disk-brake lock (FIG. 5C) it is absent from the handlebar assembly 74 (FIG. 5B) and therefore, when an operator wishes to prepare for driving the motorcycle, he will immediately notice that the handgrip is missing and thus will be prompted or alerted, becoming aware that the disk-brake lock is still engaged. Further, the operator will not be able to shift the motorcycle into gear and it is thus unlikely that the machine can be driven.

Figure 6A:
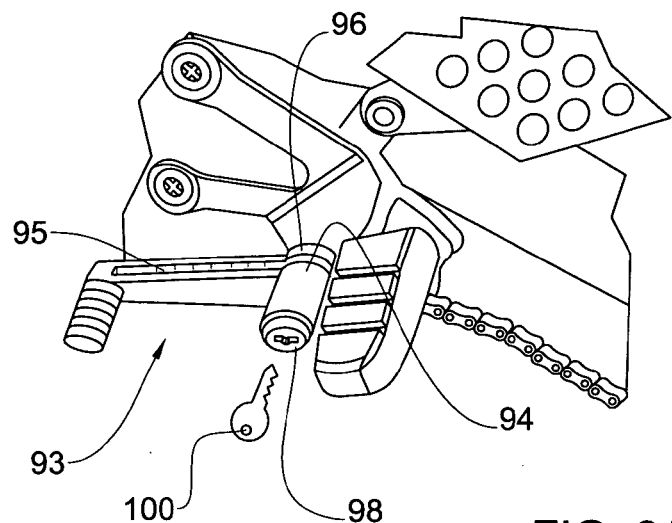
FIG. 6A shows a gear-shift paddle useful also as a disk-brake lock, according to still another embodiment of the present invention.
Figure 6B:
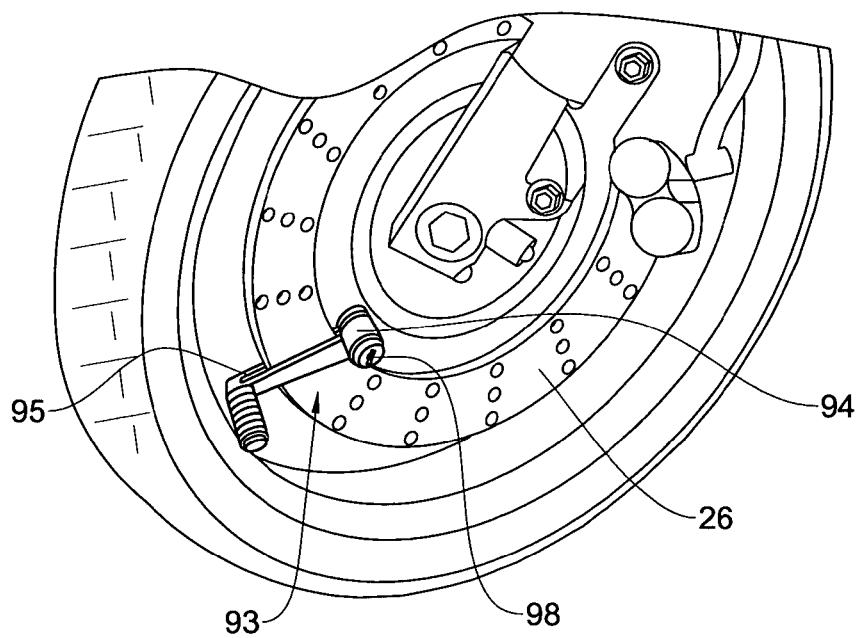
FIG. 6B shows a portion of a disk-brake fitted with the disk-brake lock/gear-shift paddle in use as a motorcycle disk-brake lock.
Figure 6C:
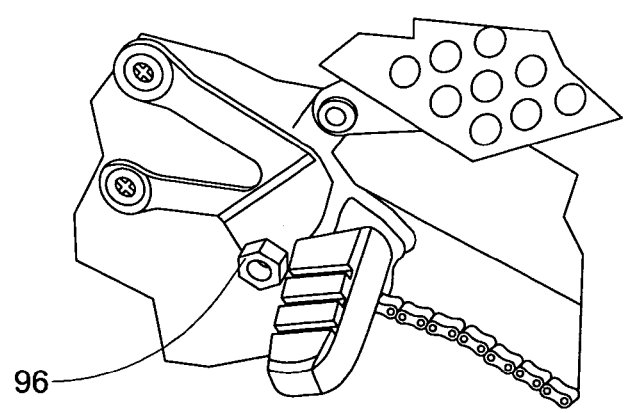
FIG. 6C shows the gear-shift paddle mounting adapter upon removal of the disk-brake lock/gear-shift paddle.

Turning now to FIGS. 6A-6C, there is illustrated still a different embodiment wherein a gear-shift pedal 93 is dual-function and serves as a gear-shift pedal (FIG. 6A) and as a disk-brake lock (FIG. 6B). The gear-shift pedal 93 comprises a disk-brake receiving slot 95 and a connecting portion 94 (FIG. 6A) for lockingly mounting over a connecting/mounting unit 96 (FIG. 6C) by means of a locking mechanism 98 and an appropriate key 100. Connecting/mounting unit 96 has a hexagonal cross-section (FIG. 6C) snugly receivable within a corresponding receptacle formed at the gear-shift pedal 93 (not seen) to thereby fix the relative angular position there between.

In its function as a gear-shift pedal 93 (FIG. 6A) the device is tightly secured to the mounting unit 96 to avoid relative displacement between the gear-shift pedal 93 and the mounting unit 96 whereby gear shifting by said pedal is not effected.

In its function as a disk-brake lock, the gear-shift pedal 93 is secured over the disk-brake 26 and is locked in place by means of the locking mechanism 98, as in FIG. 6B. A protective cap or cover may be fitted over the locking mechanism 98, for the reasons mentioned hereinabove.

It is appreciated that in its function as a disk-brake lock, the gear-shift pedal 93 is absent from its originally intended position as a gear-shift pedal (FIG. 6A) whereupon the motorcycle cannot be operated and whereby the motorcycle rider will be prompted and alerted, and become aware of the fact that the disk-brake lock is engaged with the disk-brake instantaneously upon sitting on the motorcycle.

Figure 7A:
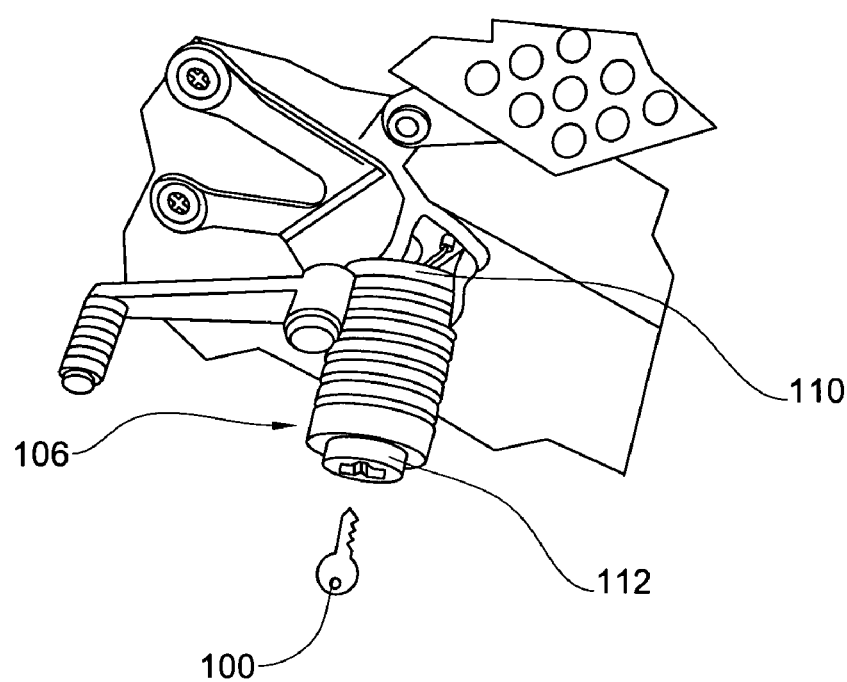
FIG. 7A shows a footpeg useful as disk-brake according to a further embodiment of the invention.
Figure 7B:
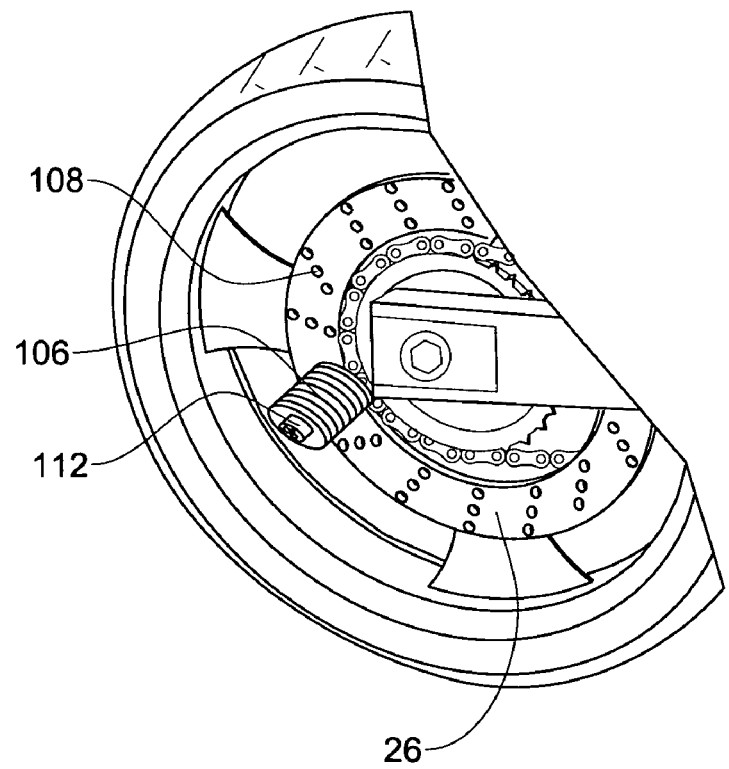
FIG. 7B shows the disk-brake of FIG. 7A lockingly mounted on a disk-brake of a rear wheel of a motorcycle.

The embodiment of FIGS. 7A and 7B illustrates still a modification of the invention wherein a footpeg (also referred to as a foot rest) 106 is a dual-function device serving as a footpeg in FIG. 7A to facilitate gear shifting, and serving as a king-pin type disk-brake lock (FIG. 7B), for lockingly engaging within one of the plurality of holes 108 formed in a conventional disk-brake 26 (on either a front or rear disk-brake of the motorcycle).

The footpeg 106 is lockingly mounted to a corresponding mounting unit 110 and is lockingly attached or detached therefrom by means of the locking mechanism 112 of the king-pin. By the same king-pin and locking mechanism the footpeg 100 is lockingly engaged to the disk-brake (a rear wheel of the motorcycle in the present example), as in FIG. 7B. According to some other embodiments (not shown) rather or in addition to using the footpeg 106, one could also use the gear-shift paddle, a hand-grip, etc.

Similar to the arrangement of the previous embodiments, also in the embodiment depicted in FIGS. 7A and 7B, the disk-brake lock/footpeg serves as an anti-theft device such that the motorcycle cannot be operated with the disk-brake lock engaged on the one hand, whilst, on the other hand, an attempt to operate the motorcycle with the disk-brake lock 106 engaged, will immediately prompt and alert the operator who will become aware that the disk-brake lock is still engaged.

Figure 8A:
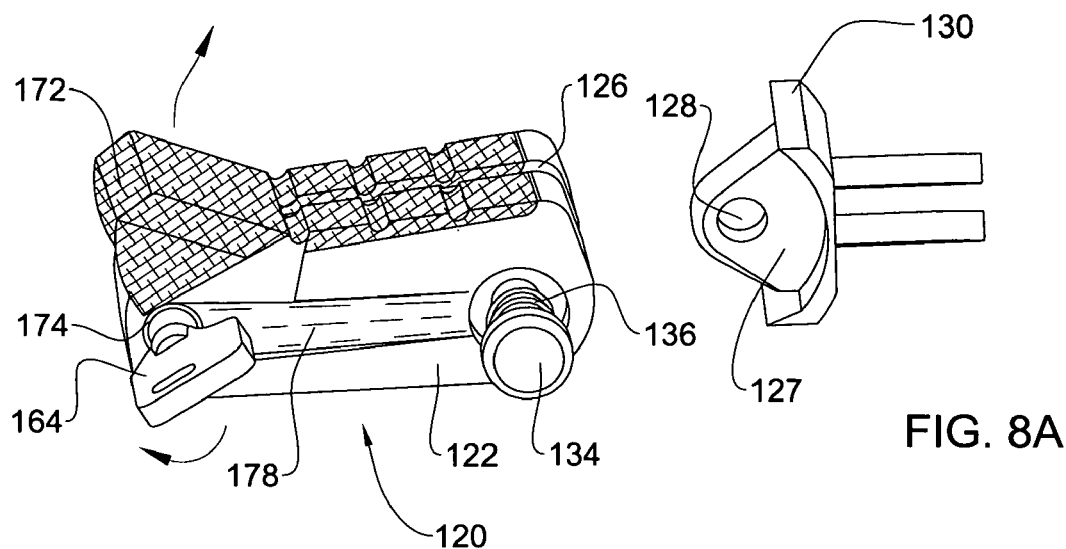
FIG. 8A is an isometric view of a foot rest/disk-brake lock according to an embodiment of the invention, detached from a corresponding mounting unit.
Figure 8B:
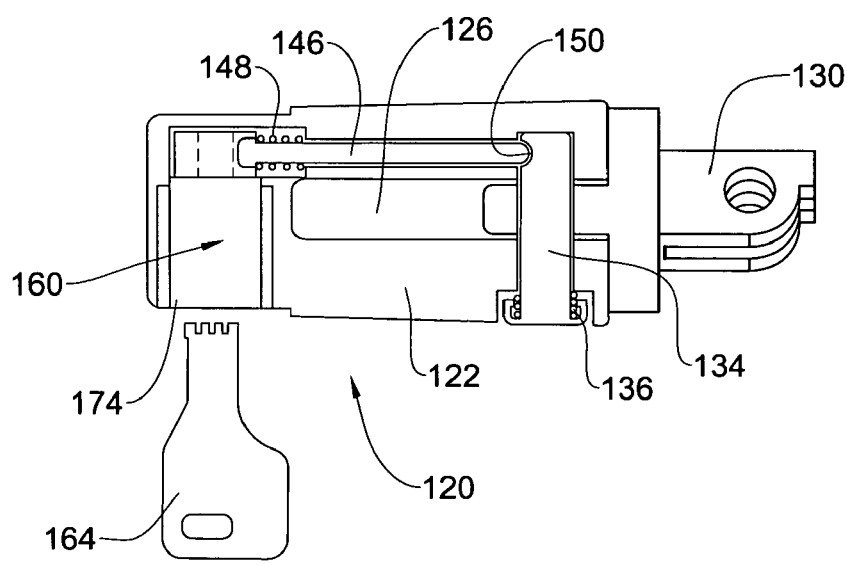
FIG. 8B is a schematic sectioned representation illustrating the foot rest/disk-brake lock of FIG. 8A lockingly engaged to the mounting unit.
Figure 8C:
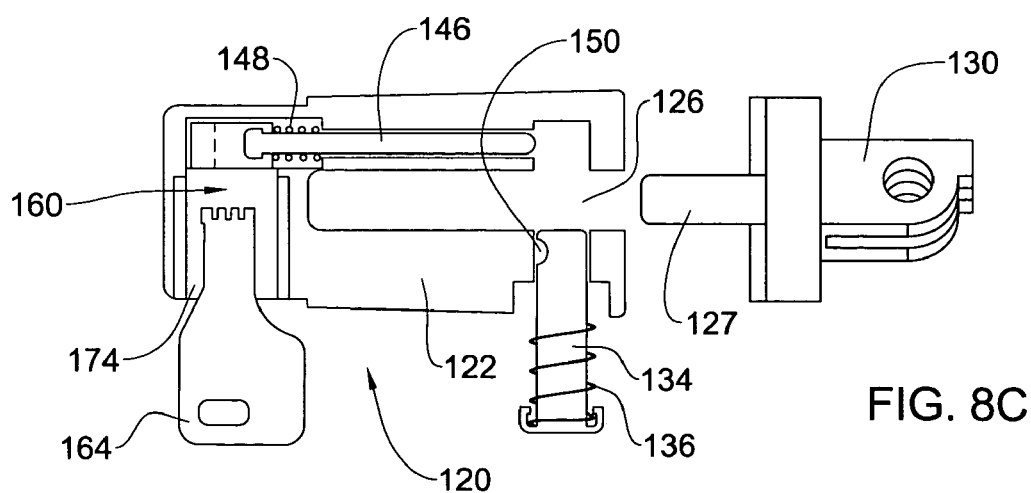
FIG. 8C is the same as FIG. 8B, illustrating the foot rest/disk-brake lock detached from the mounting unit.

Further attention is now directed to FIGS. 8A-8C of the drawings illustrating a particular embodiment of a footrest-disk-brake lock in accordance with a modification of the present invention. The footrest generally designated 120 has an overall shape similar to footpeg 14 as illustrated in FIG. 4, and comprises a body portion 122 formed with a disk-receiving slot 126 sized and shaped for alternate locking engagement with a connector 127 of a mounting unit 130 (similar to mounting unit 62 in FIG. 3B) and for locking engagement in an embracing manner over a disk-brake as explained in connection with the embodiments of FIGS. 2 to 4.

The footpeg 120 further comprises a locking pin 134 spring biased by a coil-spring 136 into its retracted position as in FIGS. 8A and 8C, though prevented from removal e.g. by a restricting pin (not seen), so as to prevent losing the pin 134 and the associated spring 136. Pin 134 serves for locking engagement of the footpeg 120 by penetration into hole 128 (FIG. 8A) of mounting unit 130 and for locking embracement over a brake-disk.

Locking pin 134 is controlled by an axially displaceable locking rod 146, fitted for arresting the locking pin 134 by engagement with a corresponding notch 150 formed at an end of the locking pin 134 (FIGS. 8B and 8C). By means of a coiled spring 148 the rod is biased to retract from the notch 150. Locking rod 146 is manipulable by means of a locking mechanism 160 which by a removable key 164 propels the locking pin 146 into locking engagement with notch 150 of the locking pin 134 (FIG. 8B), to facilitate its locking engagement with a mounting unit 130 or embracingly over a disk-brake (not shown). Unlocking the lock mechanism 160 permits the locking rod 146 to spontaneously retract into its open position (FIG. 8C) to disengage from notch 150 of the locking pin 134 to thereby facilitate disengagement from the mounting unit 130 or from a brake-disk, respectively.

As can further be noted in FIG. 8A, the footpeg 120 is formed with a pivotable cover unit 172 fitted for covering the keyhole 174 of the locking mechanism 160, to thereby prevent dirt, e.g. mud, water, etc. from entering the locking mechanism.

Furthermore, the footpeg 120 is formed with a gliding grove 178, which facilitates easy location of the keyhole 174 by mealy sliding the key 164 over the grove 178, directing the key 164 into the keyhole 174. This arrangement is useful for fast insertion of the key into the keyhole also at extreme conditions e.g. at poor visibility, wearing gloves, etc. Still, the arrangement is such that sliding the key 164 over the gliding grove 178, entails displacement of the cover unit 172 into its open positing.

It is apparent that a motorcycle may be fitted with two or more locking arrangements according to the invention where, for example, one lock is fitted for locking engagement with the front disk-brake (either by embracing or as a king-pin type lock) and an other lock is fitted for locking engagement with the rear disk-brake (typically as a king-pin type lock). It is thus possible to increase the security level by providing more than one locking mechanism and by simultaneous removal more than one essential component from the motorcycle.

In addition to solving the problem of a motorcycle operator inadvertently attempting to ride the motorcycle with a disk-brake lock engaged, the device of the present invention also solves the problem of storing and transporting the lock when not in use, since the lock is transported in the form of a footpeg.

The disk-brake lock/footpeg of the present invention therefore provides an effective method for efficiently and conveniently transporting a disk-brake lock, while also preventing damage to the motorcycle and the operator by neglecting to remove the disk-brake lock before commencing operation of the motorcycle.

According to other modifications of the invention the mounting unit comprises a discreet connector for connecting only to a designated mating coupler of the component. Such a discreet connection may be obtained, for example, by forming the mounting unit in the form of a pin having a polygonal cross section or an abnormal cross section, where the mating portion of the locking mechanism of the lock component has a receptacle formed with a corresponding cross section.

By a further embodiment, the locking member may constitute part of an electronic immobilizing system, such that, for example, the ignition system of the motorcycle will not ignite at the absence of the locking component (e.g. footpeg or hand-grip) from its functional location attached to the motorcycle. Evermore so, the arrangement may be such that an attempt to ignite the motorcycle before attaching the locking member to its functional location, may trigger an alarm signal such as an audible signal, etc.

As is evident from the above, in the absence of the functional component, the mounting unit by itself does not provide the starting or driving function of the functional component to any significant degree, and this absence prompts or alerts the driver that the functional component is missing from the mounting unit.

Depending on the exact nature of the functional component, in the absence of the functional component the motorcycle may either not be started/driven at all, or, sometimes, be started/driven but with great difficulty. In the latter cases, the difficulty that this presents when attempting to start or drive the motorcycle generally prompts alerts in the driver that the component is not connected to the mounting unit. Once the driver is alerted, he/she is further prompted to immediately check the disk brakes, as the association is normally made by the driver that if the functional component is not mounted to the mounting unit, then it is probably acting as a lock and is probably still being used to lock one of the disk brakes. Accordingly, in the normal course of events, once the driver is alerted that the lock may still be engaged on the brake, it is then inconceivable and at least highly unlikely, and in some cases impossible, for the motorcycle to be started or driven until the lock is removed from the disk brake and reconnected to the mounting unit.

When two locks are used, one for the front wheel brake and one for the rear wheel brake, both locks being functional components in the meaning of the present invention, it is even less likely for the driver to start or drive the motorcycle when the functional components are not connected to their respective mounting units, as the multiple alerts prompt the driver to remember that the locks may still be in place locking the disk brakes, and that attempting to drive the motorcycle in this state is not recommended.

According to the invention, a motorcycle disk-brake lock is provided which makes it highly unlikely or prevents normal operation of the motorcycle while the lock is engaged with a disk-brake of the motorcycle and to thereby provide a clear alert to an operator thereof, and which can be conveniently stored and transported when not in use as a disk-brake lock.

Whilst several embodiments have been shown and described, it is to be understood that it is not intended thereby to limit the disclosure, but rather it is intended to cover all embodiments, modifications and arrangements falling within the spirit and the scope of the present invention, as defined in the appended claims, mutatis mutandis.

The invention claimed is:

1. A lock for a motorcycle (10) said lock is detachably connectable to a mounting unit (42,76,96) of the motorcycle said lock is suitable for locking engagement to a disk-brake (26) of the motorcycle, wherein said lock is further configured as a functional component of the motorcycle as required for at least one of starting and driving the motorcycle when connected to said mounting unit, such that whenever said functional component is detached from the mounting unit the absence of the functional component from the mounting unit provides a prompt to alert the user, at least when attempting to start or drive the motorcycle, that the functional component may still be lockingly engaged to the disk-brake, in which case starting or driving of the motorcycle becomes at least highly unlikely.

2. A lock according to claim 1, wherein the functional component comprises any one of a footpeg (14), a hand-grip (70) or a gear-shift paddle (93) of the motorcycle.

3. A lock according to claim 1, wherein the functional component comprises a U-like shaped portion (54) with a disk-receiving slot (60) formed between arms of the component for embracing a portion of the disk-brake (26) of the motorcycle.

4. A lock according to claim 3, wherein the disk-receiving slot (60) extends between two parallel walls of the arms.

5. A lock according to claim 1, wherein the functional component comprises a rigid metal core formed or coated with an anti-slip surface (56,82).

6. A lock according to claim 1, wherein the functional component is detachably connectable to the mounting unit (42) by a pin-type locking mechanism (46,88,89) adapted for locking engagement with the mounting unit and for locking engagement with an aperture formed in the disk-brake.

7. A lock according to claim 6, wherein the functional component is at least one component selected from the group comprising a hand-grip (70), a footpeg (14) and a gear paddle (93).

8. A lock according to claim 1, wherein a gear shifting mechanism of the motorcycle comprises a footpeg (14) and a gear paddle (93), both of which being detachable functional components suited for locking engagement with a disk-brake (26) of the motorcycle.

9. A lock according to claim 1, wherein the functional component accommodates an alarm system for generating an audible alarm signal upon attempting to move the motorcycle when the component is in locking engagement with the disk-brake (26).

10. A lock according to claim 1, wherein the functional component comprises an electronic immobilizer cooperating in conjunction with the mounting unit (43,76,96), to thereby dysfunction an ignition system of the motorcycle whenever the component is detached from the mounting unit.

11. A lock according to claim 10, wherein an attempt to ignite the motorcycle prior to attaching the functional component to the mounting unit, generates an alarm signal.

12. A lock according to claim 1, wherein the mounting unit comprises a connector portion (64,127) connectable to the functional component.

13. A lock according to claim 1, wherein it is highly unlikely or not possible at all to start and roll the motorcycle (10) before disengaging the functional component from the disk-brake (26) and reengaging it at a location of the motorcycle in which it is capable to perform its function essential for starting or driving the motorcycle.

14. A lock according to claim 1, wherein the functional component may be retro-fitted to the motorcycle.

15. A lock according to claim 1, wherein the mounting unit (43,76,96) may be retro-fitted to the motorcycle.

16. A lock according to claim 6, wherein the locking mechanism (160) is fitted with a key-hole (174) provided with a cover unit (172).

17. A lock according to claim 16, wherein the key-hole (174) extends within a guide-track (178) to facilitate guiding a key (164) into said key-hole (174).

18. A lock according to claim 6, wherein the locking mechanism (160) comprises a retractable locking pin (134) adapted to function as a coupling hinge.

19. A lock according to claim 1, wherein the functional component is a footrest fitted at a bottom face thereof with a ground-sensing probe.

20. A locking system for a motorcycle (10) comprising a lock detachably connected to a mounting unit (42,76,96) that is fixable to the motorcycle, said lock being suitable for locking engagement to a disk-brake (26) of the motorcycle, wherein said lock is further configured as a functional component of the motorcycle as required for at least one of starting and driving the motorcycle when connected to said mounting unit, such that whenever said functional component is detached from the mounting unit, the mounting unit in the absence of the functional component provides a prompt to alert the user, at least when attempting to start or drive the motorcycle, that the functional component is not connected to the mounting unit.

21. A locking system according to claim 20, wherein the functional component comprises any one of a footpeg (14), a hand-grip (70) or a gear-shift paddle (93) of the motorcycle.

22. A motorcycle (10) with at least one lock detachably connectable to a mounting unit (42,76,96,130) of the motorcycle, said lock is suitable for locking engagement to a disk-brake (26) of the motorcycle, wherein said lock is further configured as a functional component of the motorcycle as required for at least one of starting and driving the motorcycle when connected to said mounting unit, such that whenever said functional component is detached from the mounting unit the absence of the functional component from the mounting unit provides a prompt to alert the user, at least when attempting to start or drive the motorcycle, that the functional component may still be lockingly engaged to the disk-brake, in which case starting or driving of the motorcycle becomes at least highly unlikely.

23. A method for substantially reducing the risk of a motorcycle being at least one of started or driven by a user when a brake lock is still engaged on a disk brake of the motorcycle, comprising:
   (a) providing such a brake lock in a suitable form to further function as a functional component of the motorcycle as required for at least one of starting and driving the motorcycle when connected to a mounting unit of the motorcycle;
   (b) engaging the brake lock of step (a) to the disk brake when it is desired to lock the motorcycle;
   (c) disengaging the brake lock from the disk brake when it is desired to unlock the motorcycle;
   wherein the absence of the functional component from the mounting unit following step (b) may compel the user, at least when attempting to start or drive the motorcycle, to check that the functional component may still be lockingly engaged to the disk-brake, and further prompt the user to execute step (c) before attempting to start or drive the motorcycle.

* * * * *